United States Patent
Yamada et al.

(10) Patent No.: US 11,794,563 B2
(45) Date of Patent: Oct. 24, 2023

(54) BATTERY ATTACHMENT MECHANISM

(71) Applicant: Kubota Corporation, Osaka (JP)

(72) Inventors: Masahiro Yamada, Sakai (JP); Hirokazu Ito, Sakai (JP)

(73) Assignee: Kubota Corporation, Osaka (JP)

( * ) Notice: Subject to any disclaimer, the term of this patent is extended or adjusted under 35 U.S.C. 154(b) by 205 days.

(21) Appl. No.: 17/106,707

(22) Filed: Nov. 30, 2020

(65) Prior Publication Data

US 2021/0300167 A1    Sep. 30, 2021

(30) Foreign Application Priority Data

Mar. 24, 2020  (JP) .................................. 2020-052468

(51) Int. Cl.
| | |
|---|---|
| *B60K 1/04* | (2019.01) |
| *A01D 34/78* | (2006.01) |
| *A01D 69/02* | (2006.01) |
| *A01D 34/64* | (2006.01) |
| *A01D 101/00* | (2006.01) |

(52) U.S. Cl.
CPC ................ *B60K 1/04* (2013.01); *A01D 34/78* (2013.01); *A01D 69/02* (2013.01); *A01D 34/64* (2013.01); *A01D 2101/00* (2013.01); *B60K 2001/0455* (2013.01)

(58) Field of Classification Search
CPC .. B60K 1/04; B60K 2001/0455; A01D 34/78; A01D 34/64; A01D 69/02
See application file for complete search history.

(56) References Cited

U.S. PATENT DOCUMENTS

| | | | | |
|---|---|---|---|---|
| 8,037,953 | B2* | 10/2011 | Puskar-Pasewicz ... | A61G 5/042 180/68.5 |
| 9,073,535 | B2* | 7/2015 | Jenkins, Jr. ........... | B60W 20/00 |
| 9,381,820 | B2* | 7/2016 | Yamamaru ............. | B60L 50/61 |
| 10,334,777 | B2* | 7/2019 | Uemura ............... | A01D 34/008 |
| 2006/0078409 | A1* | 4/2006 | Takeda ................ | H01M 50/256 198/300 |

(Continued)

FOREIGN PATENT DOCUMENTS

| | | |
|---|---|---|
| EP | 0741060 A2 | 6/1996 |
| JP | H1158322 U | 11/1989 |

(Continued)

*Primary Examiner* — Jason D Shanske
*Assistant Examiner* — James J Triggs
(74) *Attorney, Agent, or Firm* — THE WEBB LAW FIRM

(57) ABSTRACT

An electric powered work vehicle is to be configured so that holding of the battery at the storage position can be carried out easily at the time of attachment of the battery. There is provided guide mechanism for movably guiding the battery while supporting it along a horizontal direction between a storage position and a detachment position located away from the storage position along the horizontal direction. There is provided a holding mechanism configured to be automatically operated to a holding state capable of holding the battery at the storage position when the battery is moved to the storage position along the guide mechanism. There is provided a releasing operational portion manually operable to render the holding mechanism to a releasing state for allowing movement of the battery to the detachment position.

12 Claims, 15 Drawing Sheets

(56) References Cited

U.S. PATENT DOCUMENTS

| | | | | |
|---|---|---|---|---|
| 2008/0264026 | A1* | 10/2008 | Ishii | B60K 17/356 56/10.8 |
| 2017/0349039 | A1* | 12/2017 | Rayner | B60K 1/04 |
| 2020/0156500 | A1* | 5/2020 | Huff | B60L 58/21 |
| 2021/0229559 | A1* | 7/2021 | Clark | B60L 50/66 |

FOREIGN PATENT DOCUMENTS

| | | |
|---|---|---|
| JP | 201811574 A | 1/2018 |
| JP | 201812464 A | 1/2018 |

* cited by examiner

BATTERY ATTACHMENT MECHANISM

CROSS-REFERENCE TO RELATED APPLICATION

This application claims priority to Japanese Patent Application No. 2020-052468 filed Mar. 24, 2020, the disclosure of which is hereby incorporated by reference in its entirety.

BACKGROUND OF THE INVENTION

1. Field of the Invention

The present invention relates to an electric powered work vehicle having a battery as a power source thereof.

2. Description of the Related Art

In some electric powered mowers as an example of an electric powered work vehicle, a battery is supported to a rear portion of the vehicle body.

In Japanese Unexamined Patent Application Publication No. 2018-11574 (Patent Document 1), there is provided a guide mechanism configured to guide a battery supported thereto movably in a front/rear direction. In operation, the battery is guided by the guide mechanism to which it is supported, between a storage position where the battery is stored in the vehicle body and a detachment position where the battery is located rearwardly away from the storage position to be detachable.

When the battery is to be detached for its replacement, a worker will move the battery from the storage position to the rearward detachment position and then lower the battery from the detachment position (guide mechanism) and place it on the ground surface. When the battery is to be attached, the worker will slightly elevate the battery placed on the ground surface and place it at the detachment position (guide mechanism) and then move it from the detachment position to the storage position forwardly thereof.

Patent Document 1: Japanese Unexamined Patent Application Publication No. 2018-11574.

SUMMARY OF THE INVENTION

In an electric powered work vehicle, at the time of attachment of the battery, it is necessary to hold the battery at the storage position so that the battery will not move from the storage position toward the detachment position.

An object of the present invention is to configure an electric powered work vehicle so that holding of the battery at the storage position can be carried out easily at the time of attachment of the battery.

An electric powered work vehicle according to the present invention, comprises:
 a battery;
 a guide mechanism for movably guiding the battery while supporting it along a horizontal direction between a storage position at which the battery is accommodated in a vehicle body and a detachment position at which the battery is located away from the storage position along the horizontal direction to be detachable;
 a holding mechanism configured to be automatically operated to a holding state capable of holding the battery at the storage position when the battery is moved to the storage position along the guide mechanism; and
 a releasing operational portion manually operable to render the holding mechanism to a releasing state for allowing movement of the battery to the detachment position.

With the present invention described above, when the battery is to be attached, a worker will slightly elevate the battery placed on the ground surface and place it at the detachment position and then move it from the detachment position to the storage position. Upon arrival of the battery at the storage position, the holding mechanism is automatically rendered to the holding state to hold the battery at this storage position.

With this, when the battery is placed at the storage position, the worker does not have to manually operate the holding mechanism to the holding state, so that state of the battery being held at the storage state can be obtained easily.

With the present invention described above, when the battery is to be detached, the worker will operate the releasing operational portion to set the holding mechanism to the releasing state and then move the battery from the storage position to the detachment position. Upon arrival of the battery at the detachment position, the worker may simply remove the battery from the detachment position and place it on the ground surface.

The holding mechanism includes an engaging portion provided in one of the battery and the guide mechanism, an engaged portion provided in the other of the battery and the guide mechanism and an urging portion urging the engaging portion toward the engaged portion for engagement therewith; and
 The holding mechanism is rendered to the holding state as the engaging portion comes into engagement with the engaged portion to act thereon.

With the present invention, as described above, when the battery is moved to reach the storage position, the engaging portion becomes engaged with the engaged portion under the urging force of the urging portion, whereby the holding mechanism is automatically rendered into the holding state. With this, the holding mechanism can be formed simple as having the engaging portion, the engaged portion and the urging portion, thus being advantageous in the respect of the simplification of the arrangement.

In the present invention, preferably, when the battery is moved from the detachment position to the storage position, the guide mechanism supports and guides the battery in such a manner that the position of the battery becomes higher progressively; and when the battery is moved from the storage position to the detachment position, the guide mechanism supports and guides the battery in such a manner that the position of the battery becomes lower progressively.

With the present invention described above, since the electric powered work vehicle travels while holding the battery at the storage position, the position of this storage position is set so as to ensure a sufficient ground clearance for the battery placed at the storage position.

With the present invention, the battery at the detachment position is set slightly lower than the battery at the storage position, and the battery at the detachment position is near the ground surface. Therefore, the operation of removing the battery at the detachment position and placing it on the ground surface as well as the operation of slightly elevating the battery placed on the ground surface to place it to the detachment position can be carried out easily.

With the present invention, when the worker effects the operation of moving the battery from the storage position to the detachment position, the position of the battery becomes lower gradually, so the worker can carry out the operation of moving the battery to the detachment position easily.

With the present invention, when the worker effects the operation of moving the battery from the detachment position to the storage position, the position of the battery is high. In this case, as the battery is supported and guided by the guide mechanism in such a manner that the position of the battery becomes higher progressively, the operation of moving the battery from the detachment position to the storage position does not place much burden on the worker.

In the present invention, preferably:
the guide mechanism supports the battery by supporting one and the other side face portions of the battery in the direction orthogonal to the moving direction of the battery by the guide mechanism along the horizontal direction; and
the holding mechanism is provided in the guide mechanism to act on both the one and other side face portions of the battery.

With the present invention described above, one and other side face portions of the battery are supported by the guide mechanism, so that the battery can be supported and guided in a stable manner by the guide mechanism.

With the present invention, since the holding mechanism is provided in the guide mechanism to act on both the one and other side face portions of the battery, the battery can be held in a stable manner at the storage position.

In the present invention, preferably, the holding mechanism acts on both the one and the other side face portions of the battery in the direction orthogonal to the moving direction of the battery by the guide mechanism along the horizontal direction.

In case the holding mechanism acts on both one and other side face portions of the battery as described above, with the present invention, the holding mechanism acts on the one and other side face portions of the battery in the direction orthogonal to the moving direction of the battery by the guide mechanism along the horizontal direction, so that the battery can be held in a stable manner at the storage position.

In the present invention, preferably, the holding mechanism is provided at a portion of the guide mechanism at the detachment position.

With the present invention described above, the holding mechanism acts on a portion of the battery which portion is distant from the storage position (a portion near the detachment position). Thus, the battery can be held in a stable manner at the storage position.

In the present invention, preferably:
there is provided a positioning portion for positioning the battery by acting on the battery located at the storage position, at a portion of this battery which is closer to the storage position than a center position of the battery in the moving direction of the battery by the guide mechanism.

With the present invention described above, for the battery located at the storage position, in addition to the acting of the holding mechanism acts on the battery portion distant from the storage position (portion near the detachment position), the positioning portion acts on the further battery portion close to the storage position (portion distant from the detachment position).

With this, as the holding mechanism and the positioning portion act on the battery portions which are distant from each other, the battery can be held at the storage position in an even more stable manner by the holding mechanism and the positioning portion.

In the present invention, preferably:
the positioning portion includes a pin disposed along the moving direction of the battery by the guide mechanism and an opening portion through which the pin is inserted/withdrawn along the moving direction of the battery by the guide mechanism; and
the positioning portion is configured to position the battery in the direction orthogonal to the moving direction of the battery by the guide mechanism with the pin being inserted in the opening portion.

With the present invention described above, when the battery is moved from the detachment position to the storage position, the pin and the opening portion will approach each other along the moving direction of the battery and the pin will be inserted in the opening portion along the moving direction of the battery, so that the positioning portion will be set to its positioning state.

When the battery is moved from the storage position to the detachment position, the pin and the opening portion will move away from each other and the pin will be withdrawn from the opening portion, so that the positioning portion will be set to its releasing state.

With the present invention above, in association with the operations of moving the battery to the storage position and to the detachment position, the positioning portion will be automatically set to the positioning state and the releasing state respectively. Thus, the worker need not manually operate the positioning portion, thus being advantageous in operability.

As the positioning portion is constituted of a simple arrangement having a pin and an opening portion, the arrangement is advantageous in the respect of simplification thereof.

For instance, in the direction orthogonal to the moving direction of the battery by the guide mechanism along the horizontal direction, if the holding mechanism acts on both one and other side face portions of the battery, the direction of the action of the positioning portion and the direction of the action of the holding mechanism are approximately perpendicular to each other, so the battery can be held in a stable manner at the storage position.

In the present invention, preferably:
support rails are provided in the one and other side face portions of the battery along the moving direction of the battery by the guide mechanism;
the guide mechanism includes a support portion capable of supporting the support rails from under;
the holding mechanism is provided at a position upwardly of the support portion; and
the battery is supported and guided with the support rails being located between the support portion and the holding mechanism to be supported to the support portion.

In the above-described arrangement of the one and other side face portions of the battery being supported by the guide mechanism, with the present invention described above, support rails are provided in the side face portions of the battery and the guide mechanism includes a support portion and also the holding mechanism is provided at a position upwardly of the support portion.

As the support rails for the battery are located between the support portion of the guide mechanism and the holding mechanism and supported as such to the support portion of the guide mechanism, even if an attempt is made to lift up the battery, this lift-up attempt is checked as the support rails for the battery come into contact with the holding mechanism.

In the present invention, preferably:
the holding mechanism and the support portion are provided at a portion of the guide mechanism at the detachment position; and
the support rail includes an sloped portion which extends downwards from its intermediate portion in the moving direction of the battery by the guide mechanism toward the side closer to the storage position.

In the above-described arrangement of the one and other side face portions of the battery being supported by the guide mechanism, with the present invention described above, in case the support rails are provided in the side face portions of the battery, with the present invention described above, the support rail is provided with a sloped portion.

When the battery is to be attached, the worker will slightly tilt the battery placed on the ground surface rearwards and insert the sloped portion of the support rails for the battery between the support portion of the guide mechanism and the holding mechanism, and will hook the sloped portions of the support rails to the support portion of the guide mechanism and lift up the entire battery to place it at the detachment position.

In this case, when the worker lifts up the entire battery, thanks to engagement between the sloped portions of the support rails of the battery and the support portion of the guide mechanism, the support rails of the battery will hardly disengage from the support portion of the guide mechanism. In this way, the operation of lifting up the entire battery can be carried out easily and smoothly.

DETAILED DESCRIPTION OF PREFERRED EMBODIMENTS

FIGS. 1 through 15 show an electric powered riding mower vehicle as an example of an electric powered work vehicle. A sign F denotes the front (forward) direction, a sign B denotes a rear (reverse) direction, a sign U denotes an upper direction, a sign D denotes a lower direction, a sign R denotes a right direction and a sign L denotes a left direction, respectively.

(General Configuration of Riding Mower Vehicle)

Figure 1:
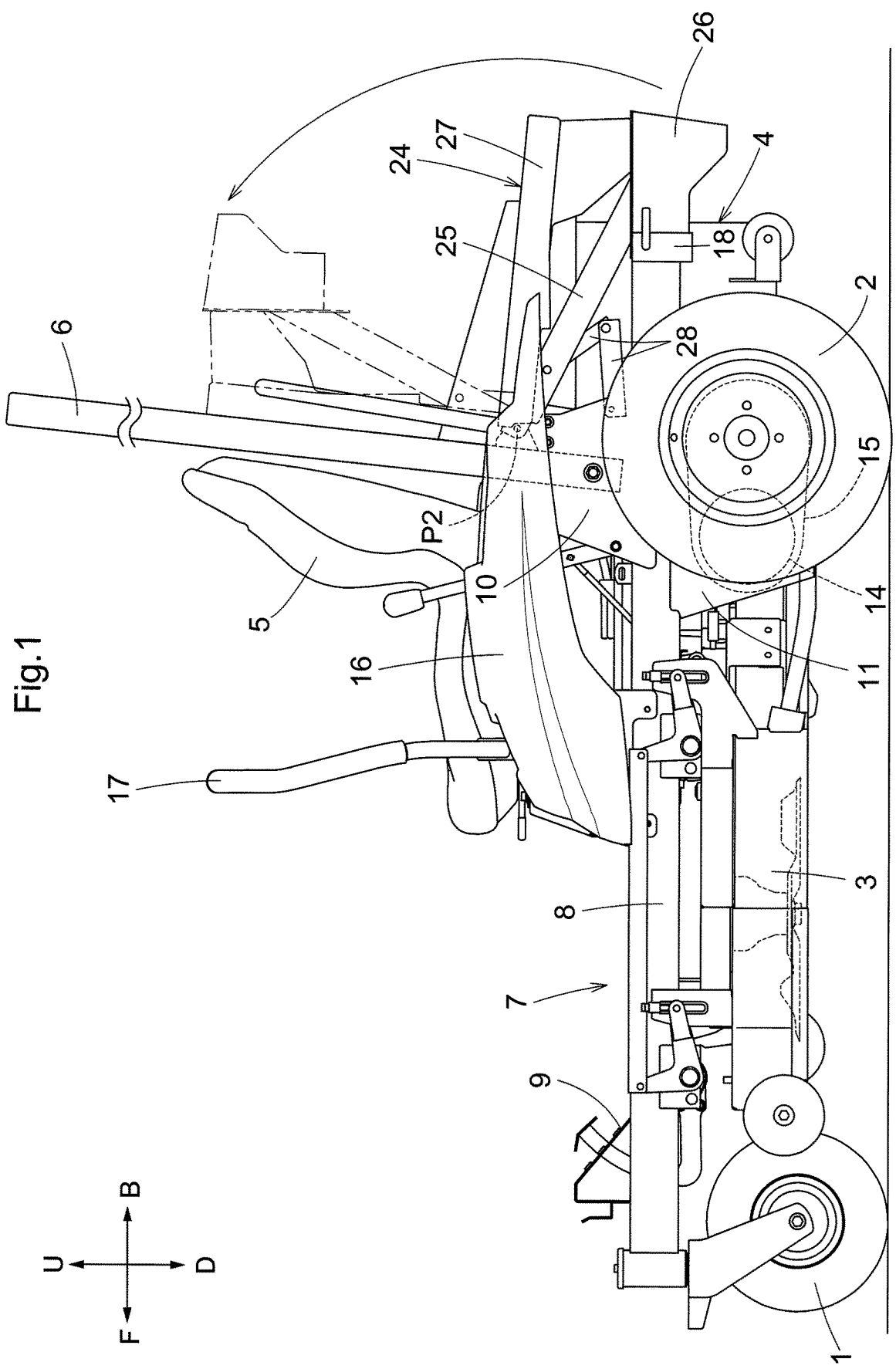
FIG. 1 is a left side view of a riding mower vehicle.
Figure 2:
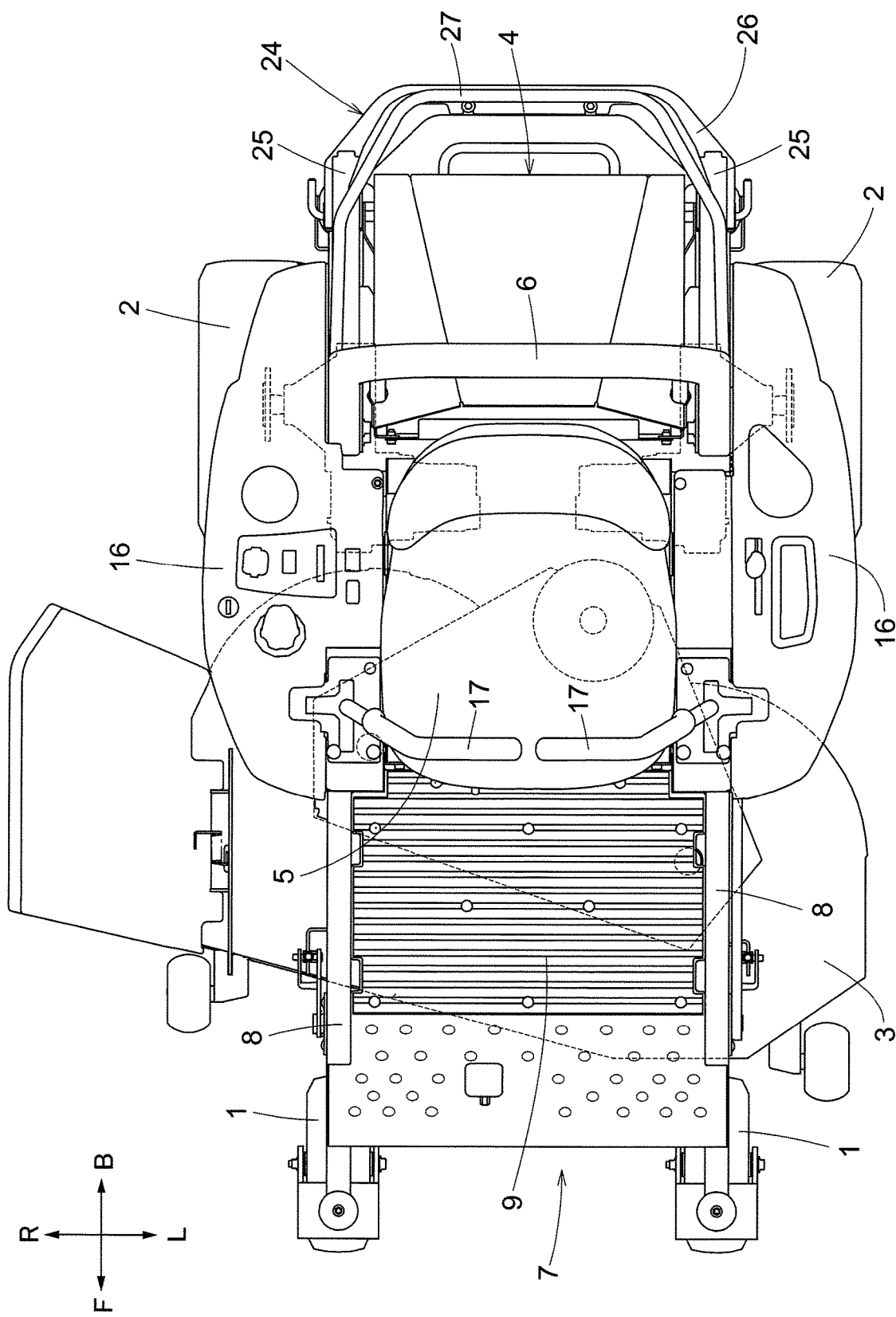
FIG. 2 is a plan view of the riding mower vehicle.

As shown in FIG. 1 and FIG. 2, the riding mower vehicle includes right and left front wheels 1 supported to front portions of a vehicle body 7, right and left rear wheels 2 supported to rear portions of the vehicle body 7, a mower 3 supported under the vehicle body 7 and between the front wheels 1 and the rear wheels 2, a battery unit 4 (corresponding to a "battery") supported to a rear portion of the vehicle body 7 and between the right and left rear wheels 2, and a driver's seat 5 and a ROPS frame 6 which are supported upwardly of the vehicle body 7.

The vehicle body 7 includes right and left vehicle body frames 8 disposed along the front/rear direction, and a floor 9 coupled to/between the right and left vehicle body frames 8. Right and left support brackets 10 are connected with upward orientation to rear portions of the vehicle body frames 8 and right and left lower portions of the ROPS frame 6 are coupled to the support brackets 10.

(Arrangements Relating to Front Wheels and Rear Wheels)

As shown in FIG. 1 and FIG. 2, the right and left front wheels 1 are provided as freely rotatable caster type wheels and are supported to front end portions of the vehicle body frames 8.

Figure 3:
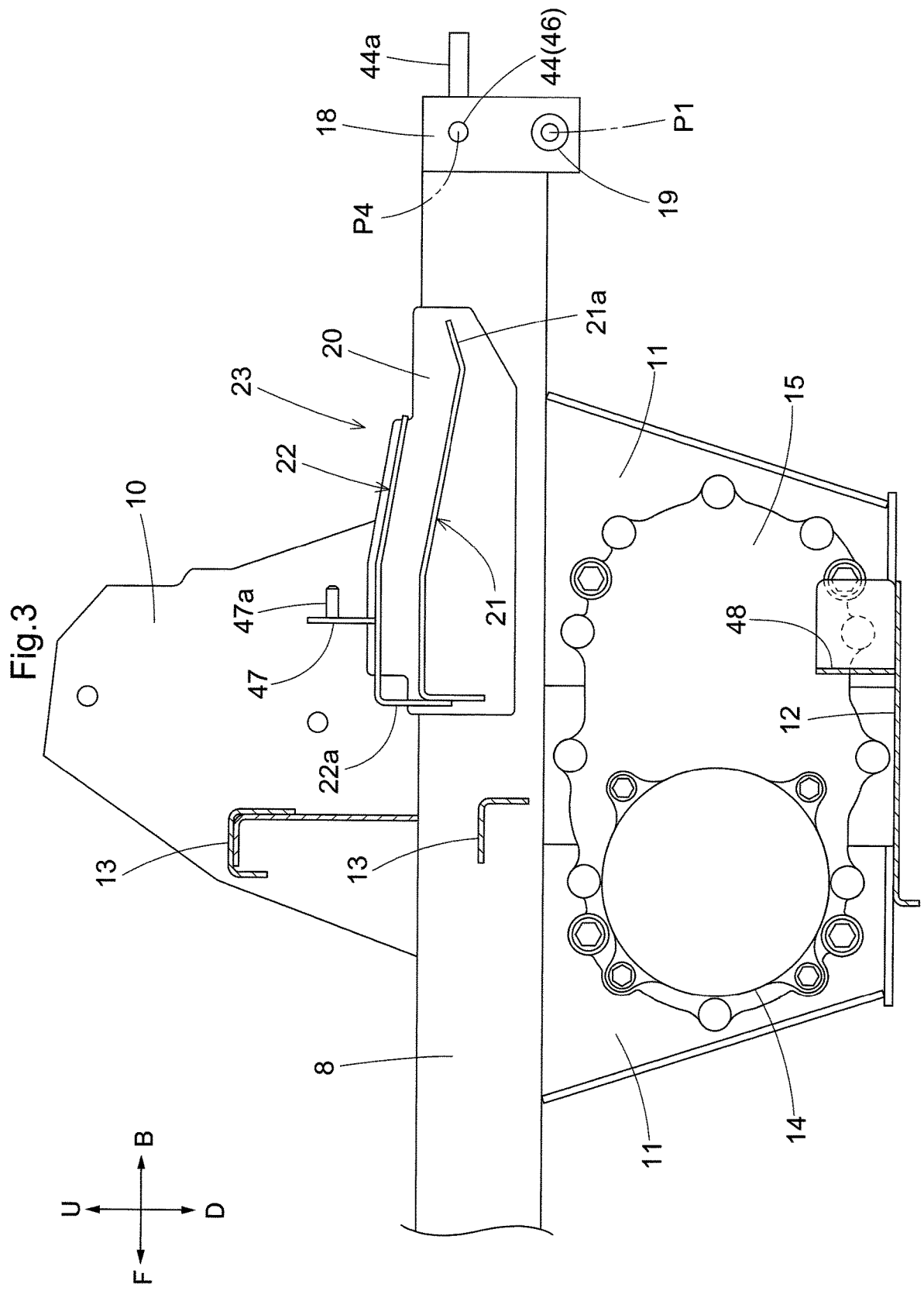
FIG. 3 is a left side view in vertical section showing vicinities of a guide mechanism and a holding mechanism.
Figure 4:
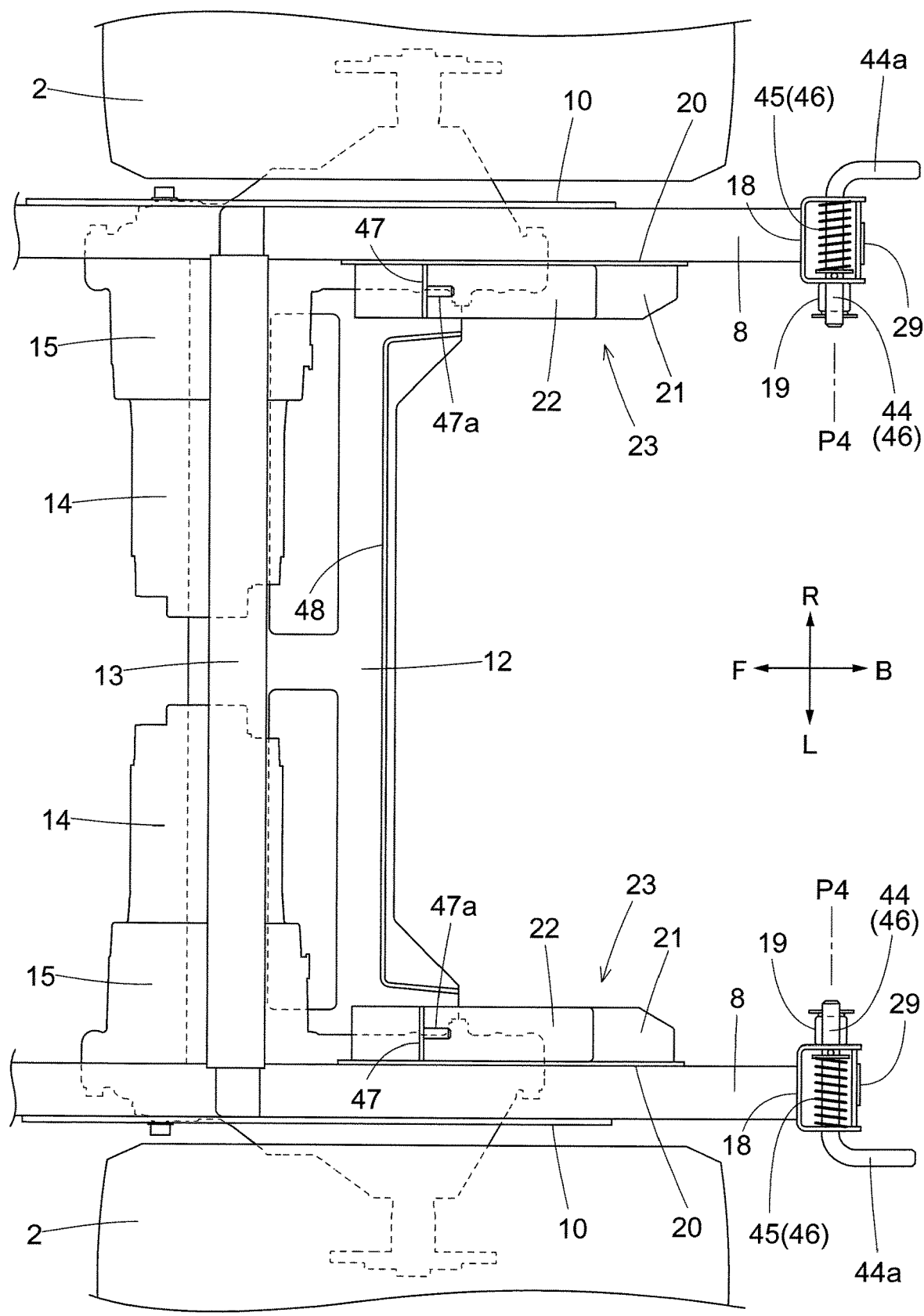
FIG. 4 is a plan view showing vicinities of the guide mechanism and the holding mechanism.
Figure 5:
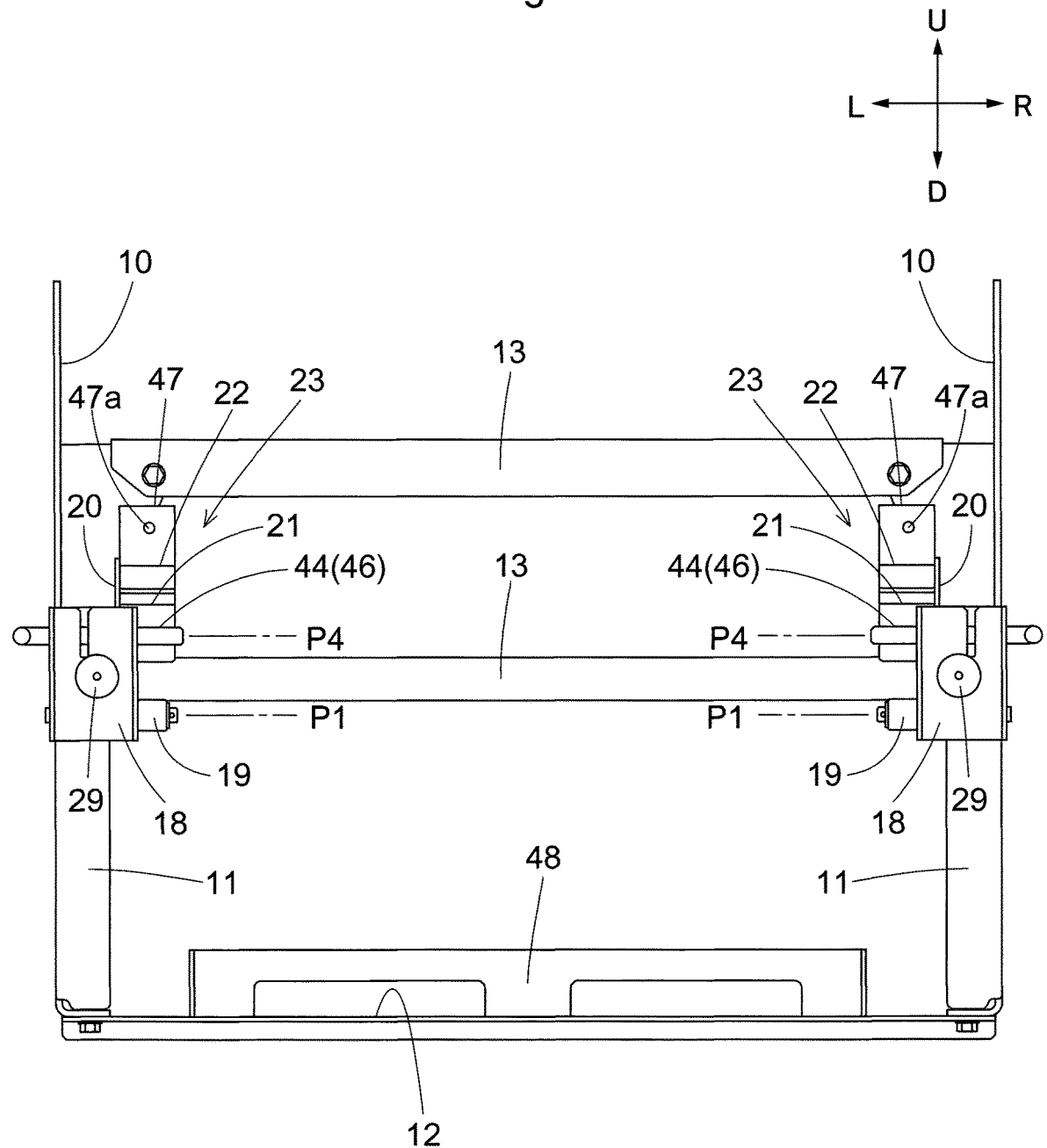
FIG. 5 is a rear view showing vicinities of the guide mechanism and the holding mechanism.

As shown in FIG. 3, FIG. 4 and FIG. 5, right and left support brackets 11 are coupled with downward orientation to rear portions of the vehicle body frames 8. To/between lower portions of the right and left support brackets 11, a fame 12 in the form of a flat plate is coupled. A frame 13 is coupled to/between the right and left support brackets 10 and coupled to/between rear portions of the right and left vehicle body frames 8.

There are provided traveling right and left electric motors 14 and right and left speed reduction mechanisms 15. The right and left speed reduction mechanisms 15 are coupled to the support brackets 11 along the front/rear direction, with the rear wheels 2 being supported to outer sides of rear portions of the speed reduction mechanisms 15 and with the electric motors 14 being coupled to inner side portions of front portions of the speed reduction mechanisms 15.

The electric motors 14 and the speed reduction mechanisms 15 are coupled to each other in the form of an angle as seen in a plan view and the right and left electric motors 14 are disposed in mutual abutment along the left/right direction and are disposed between the frame 12 and the frame 13. Powers of the electric motors 14 are transmitted to the rear wheels 2 via the speed reduction mechanisms 15, whereby the right and left rear wheels 2 are rotatably driven independently of each other.

As shown in FIG. 1 and FIG. 2, upwardly of the right and left rear wheels 2, fenders 16 are provided, and forwardly of the fenders 16, there are provided right and left speed changer levers 17. Each speed changer lever 17 can be operated from a neutral position to the forward traveling side on the front side and to the reverse traveling side on the rear side.

When the speed changer lever 17 is operated to the neutral position, the electric motor 14 corresponding thereto is rendered into a stopped state. When the speed changer lever 17 is operated to the forward traveling side, the electric motor 14 is operated to the forward traveling side; whereas, when the speed changer lever 17 is operated to the reverse traveling side, the electric motor 14 is operated to the reverse traveling side. When the right and left speed changer levers 17 are operated, the right and left rear wheels 2 are driven to the forward/reverse traveling side independently of each other, thus effecting forward traveling, reverse traveling, a right turn and a left turn.

(Arrangement of Guide Mechanism Supporting and Guiding Battery Unit)

As shown in FIGS. 3, 4, 5 and 9, right and left support brackets 18 in the form of angular pipes are coupled to rear end portions of the vehicle body frames 8; and right and left rollers 19 (corresponding to a "support portion") are supported to inner side portions of lower portions of the support brackets 18 to be freely rotatable about an axis P1 extending along the left/right direction.

Right and left support plates 20 are coupled to inner side portions of rear portions of the vehicle body frames 8, and right and left guide rails 21, 22 in the form of narrow and elongate flat plates are coupled to the support plates 20. The rear half portion of the guide rail 21 is extended obliquely downwards toward the rear side to present a sloped state. A rear portion 21a of the guide rail 21 is formed with obliquely upward orientation.

The rear half portion of the guide rail 22 is extended obliquely downwards toward the rear side, thus presenting a sloped state parallel with the rear half portion of the guide rail 21, and a front portion 22a of the guide rail 22 is bent downwards and coupled to the front portion of the guide rail 21.

As described above, there are provided guide mechanisms 23 having the rear portions of the right and left vehicle body frames 8, the right and left rollers 19, the right and left support plates 20, and the right and left guide rails 21, 22.

(Arrangement of Cover Body Covering Rear Portion of Vehicle Body)

As shown in FIG. 1 and FIG. 2, there is provided a cover body 24 which covers the rear portion of the vehicle body 7. The cover body 24 includes right and left arm portions 25, a rear frame 26 coupled to/between rear portions of the right and left arm portions 25 and a rear cover 27 formed of synthetic resin and attached to the arm portions 25 and the rear frame 26.

The front portion of the arm portion 25 is supported to the support bracket 10 to be vertically pivotable about an axis P2 extending along the left/right direction. To/between the arm portion 25 and the support bracket 10, there is connected a bendable (flexible) link member 28. A receiving portion 29 formed of hard rubber material (see FIG. 4 and FIG. 5) is attached to a support bracket 18.

The cover body 24 is operable about the axis P2 between a closing position (see FIG. 1 and FIG. 2) for covering the rear portion of the vehicle body 7 and an opening position upwardly distant from the closing position. When the cover body 24 is operated to the closing position, a right portion and a left portion of the rear frame 26 come into abutment against the receiving portions 29, whereby the cover body 24 is fixed in position. When the cover body 24 is operated to the opening position and the link member 28 is extended, the cover body 24 is maintained at the opening position by the link member 28.

The cover body 24 has no portion which corresponds to a "ceiling" (i.e. a portion opposed to the upper side of the rear portion of the vehicle body 7). Thus, when the cover body 24 is operated to the closing position, the upper side of the rear portion of the vehicle body 7 remains open and the rear side of the rear portion of the vehicle body 7 is covered by the rear frame 26 of the cover body 24 and the rear cover 27.

(Arrangement of Battery Unit)

Figure 6:
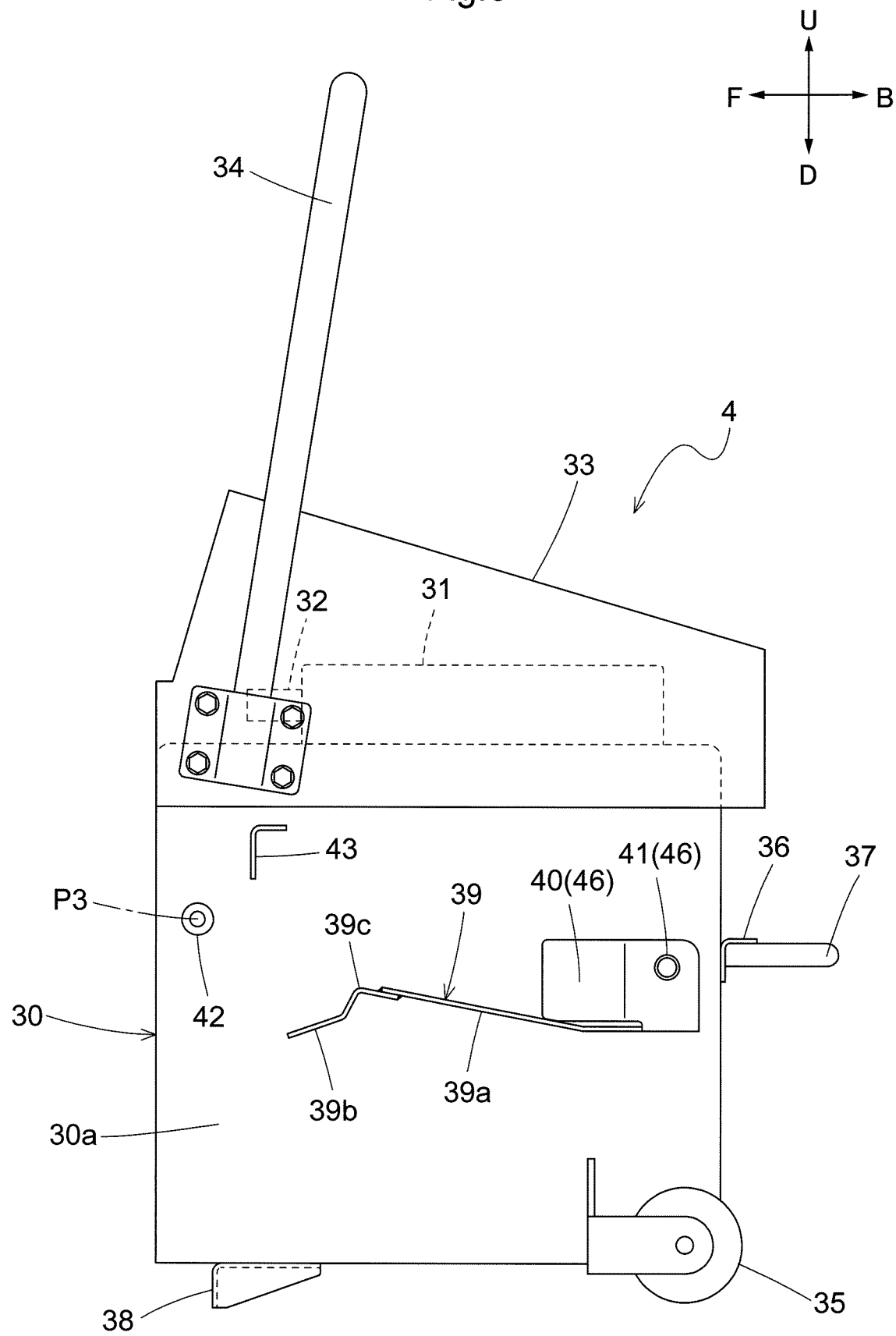
FIG. 6 is a left side view of a battery unit.
Figure 7:
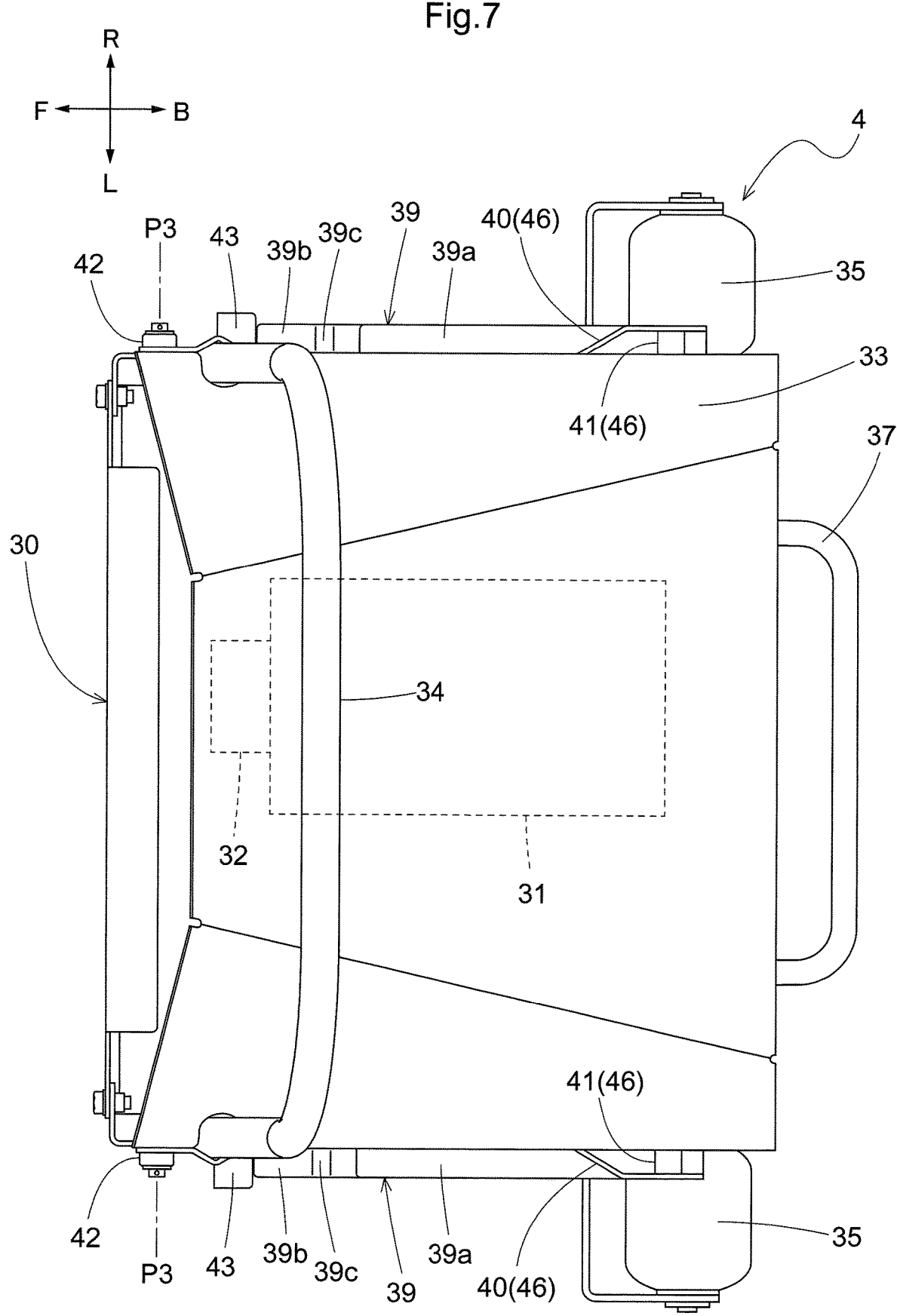
FIG. 7 is a plan view of the battery unit.
Figure 8:
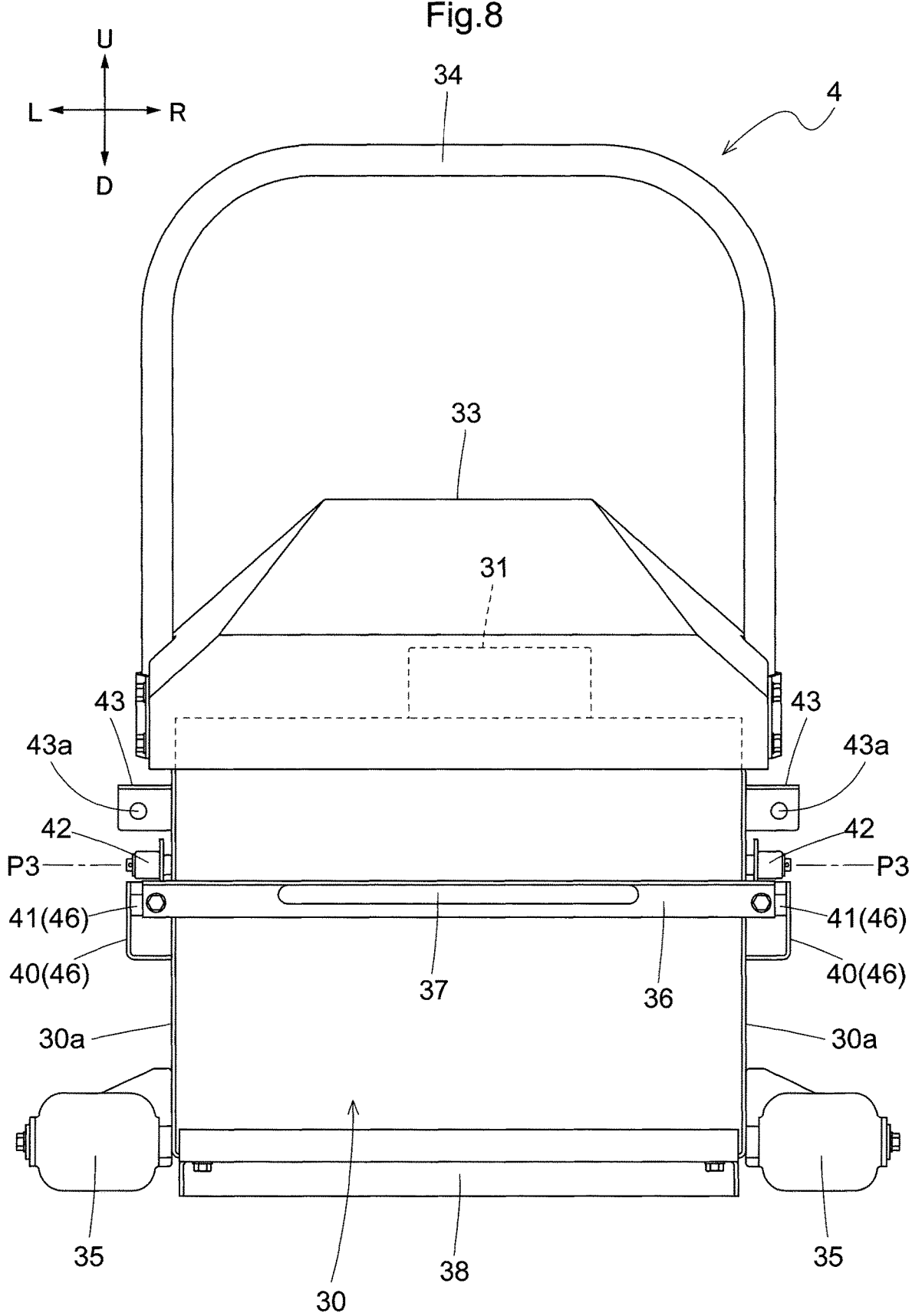
FIG. 8 is a rear view of the battery unit.

As shown in FIGS. 6, 7 and 8, the battery unit 4 is generally configured such that a battery body (not shown) is accommodated within a box-like storage body 30 formed of metal and has an arrangement to be described next.

In the ceiling portion of the storage body 30, there are provided a control device 31 for charging and discharging and a coupler 32 to which a harness from the vehicle body 7 is to be connected. And, an upper cover 33 is attached to cover the control device 31 and the coupler 32. An arch-shaped handle 34 is coupled to/between front portions of upper portions of right and left side face portions 30a (corresponding to "one and other side face portions") of the storage body 30 and disposed upwardly of the upper cover 33.

Right and left wheels 35 are supported to rear portions of lower portions of the side face portions 30a of the storage body 30. A frame 36 is coupled to/between rear portions of the side face portions 30a of the storage body 30, and an operational handle 37 is coupled the frame 36. A front support portion 38 formed of a bent plate member is coupled to a front portion of the bottom of the storage body 30. Thus, when the wheels 35 and the front support portion 38 come into contact with the ground surface, the battery unit 4 stands on its own.

Figure 9:
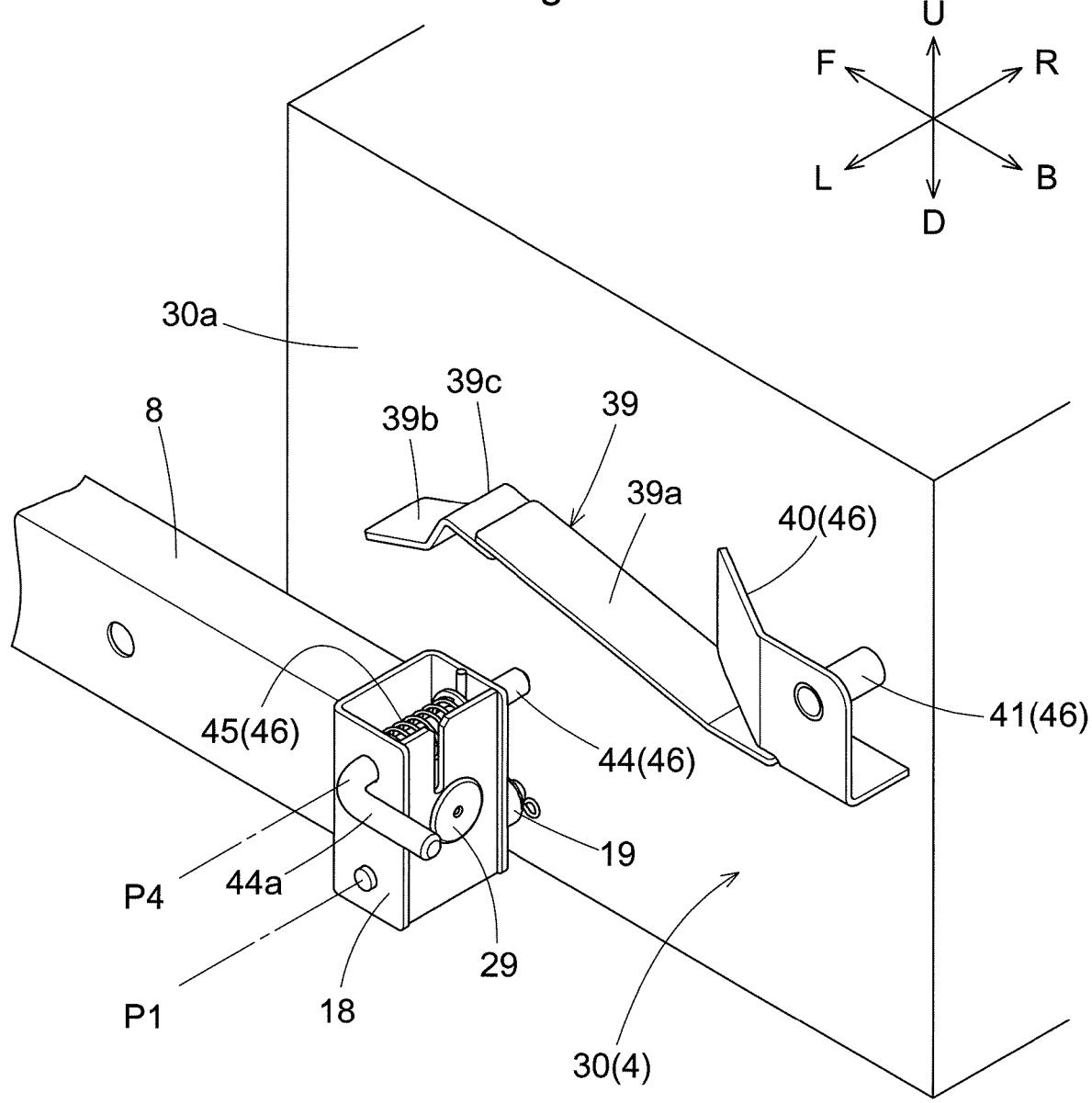
FIG. 9 is a perspective view showing a rear portion of a left vehicle body frame and vicinity of a left side face portion of the battery unit.

As shown in FIGS. 6, 7 and 9, right and left support rails 39 in the form of narrow elongated flat plates are coupled to the right and left side face portions 30a of the storage body 30 along the front/rear direction (corresponding to the "moving direction of the battery by the guide mechanism").

In the support rail 39, from its intermediate portion 39c in the front/rear direction (corresponding to an "intermediate portion in the moving direction of the battery by the guide mechanism"), there are provided a first sloped portion 39a extended with obliquely downward orientation toward the rear side (corresponding to the "side away from the storage position") and a second sloped portion 39b (corresponding to a "sloped portion") extended with obliquely downward orientation toward the front side (corresponding to the "side closer to the storage position").

As shown in FIGS. 6, 7, 8 and 9, right and left guide plates 40 in the form of narrow elongated flat plates (corresponding to an "engaged portion") are coupled to rear portions of the side face portions 30a of the storage body 30; and a pipe member 41 (corresponding to an "engaged portion") is coupled to/between opening portions of the guide plates 40 and the side face portions 30a of the storage body 30 under a posture along the left/right direction.

Right and left rollers 42 are supported to front portions of the side face portions 30a of the storage body 30 to be freely rotatable about an axis P3 extending along the left/right direction. Right and left positioning plates 43 are coupled to front portions of the side face portions 30a of the storage body 30 and openings 43a along the front/rear direction are provided in the positioning plates 43.

(Arrangement of Holding Mechanism)

As shown in FIGS. 3, 4, 5 and 9, right and left holding pins 44 (corresponding to an "engaging portion") each being constituted of a round bar member bent in the form of an angle are supported to the support brackets 18 to be movable along an axis P4 along the left/right direction.

Inside the support bracket 18, a spring 45 (corresponding to an "urging portion") is attached to the holding pin 44 and the spring 45 urges the holding pin 44 for its protrusion toward the inner side.

The bent portion of the holding pin 44 constitutes a grip portion 44a (corresponding to a "releasing operational portion"). In operation, as the worker grips this grip portion 44a of the holding pin 44, the worker can carry out an operation of pushing the holding pin 44 into the support bracket against the spring 45.

The battery unit 4 includes right and left guide plates 40 and a pipe member 41; and there is provided a holding mechanism 46 having the right and left holding pins 44 and the springs 45 provided in the vehicle body frame 8.

(Arrangement of Positioning Portion)

As shown in FIGS. 3, 4 and 5, right and left positioning plates 47 are coupled to the guide rails 22, and pins 47a are coupled with rearward orientation to the positioning plates 47 along the front/rear direction (corresponding to the "moving direction of the battery by the guide mechanism").

There is provided one set of positioning portion having the positioning plate 43 (opening portion 43a) of the battery unit 4, and the positioning plate 47 (pin 47a) of the vehicle body 7.

There is provided one set of positioning portion having the roller 42 of the battery unit 4 shown in FIGS. 6, 7 and 8 and the guide rail 21 and the guide rail 22 (front portion 22a) of the vehicle body 7 shown in FIGS. 3, 4 and 5.

As shown in FIGS. 3, 4 and 5, to a rear portion of the frame 12, there is coupled along the left/right direction a positioning plate 48 bent in a channel form as seen in the plan view. There is provided one set of positioning portion including the front support portion 38 (see FIG. 6 and FIG. 8) of the battery unit 4 and the positioning plate 48 of the vehicle body 7.

(Battery Unit Placed at Detachment Position)

Figure 10:
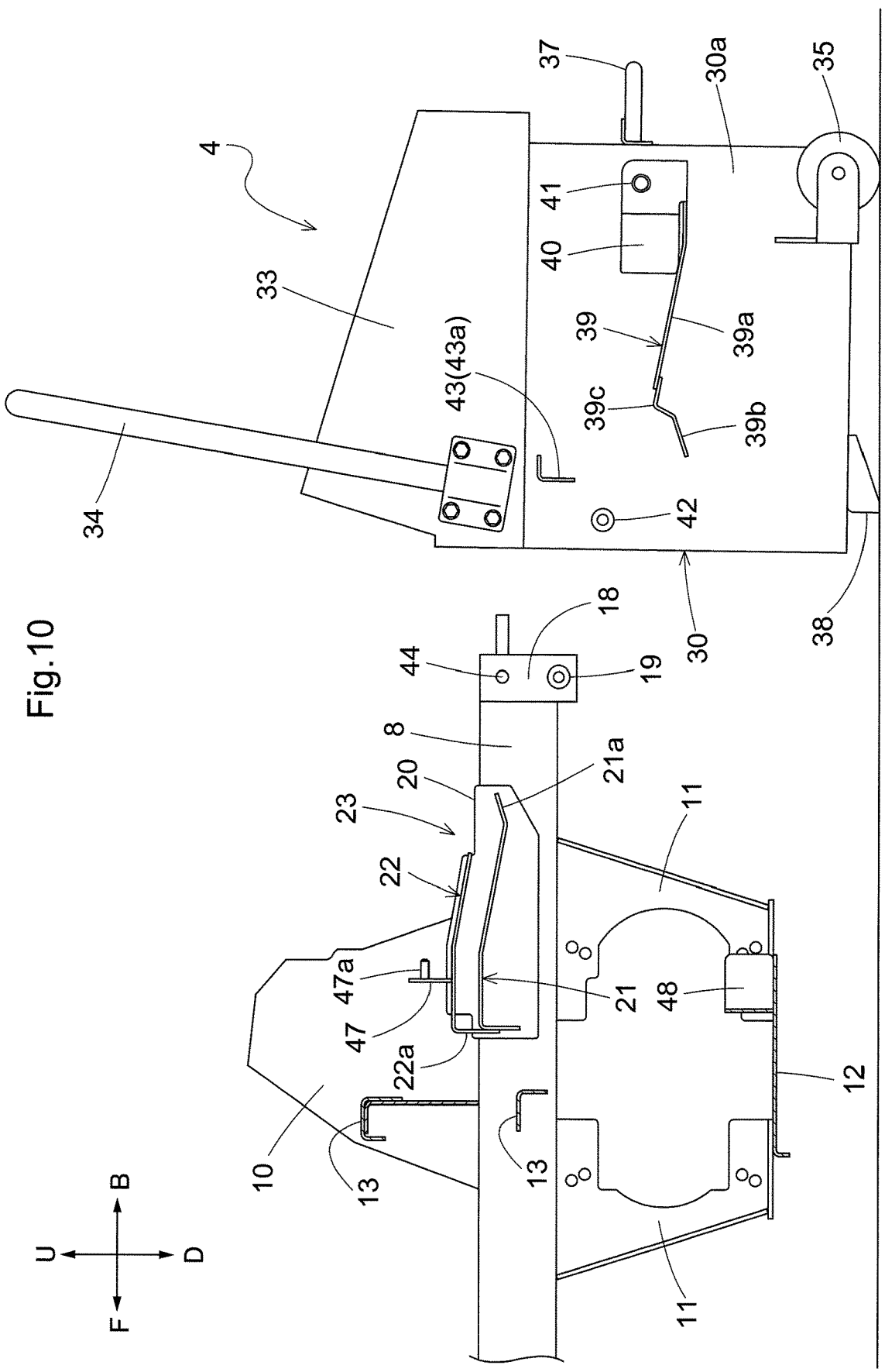
FIG. 10 is a left side view showing a situation in which the battery unit is placed on the ground surface on the rear side of the vehicle body.

The situation illustrated in FIG. 10 is a situation where the battery unit 4 is placed on the ground surface on the rear side of the vehicle body 7.

Figure 11:
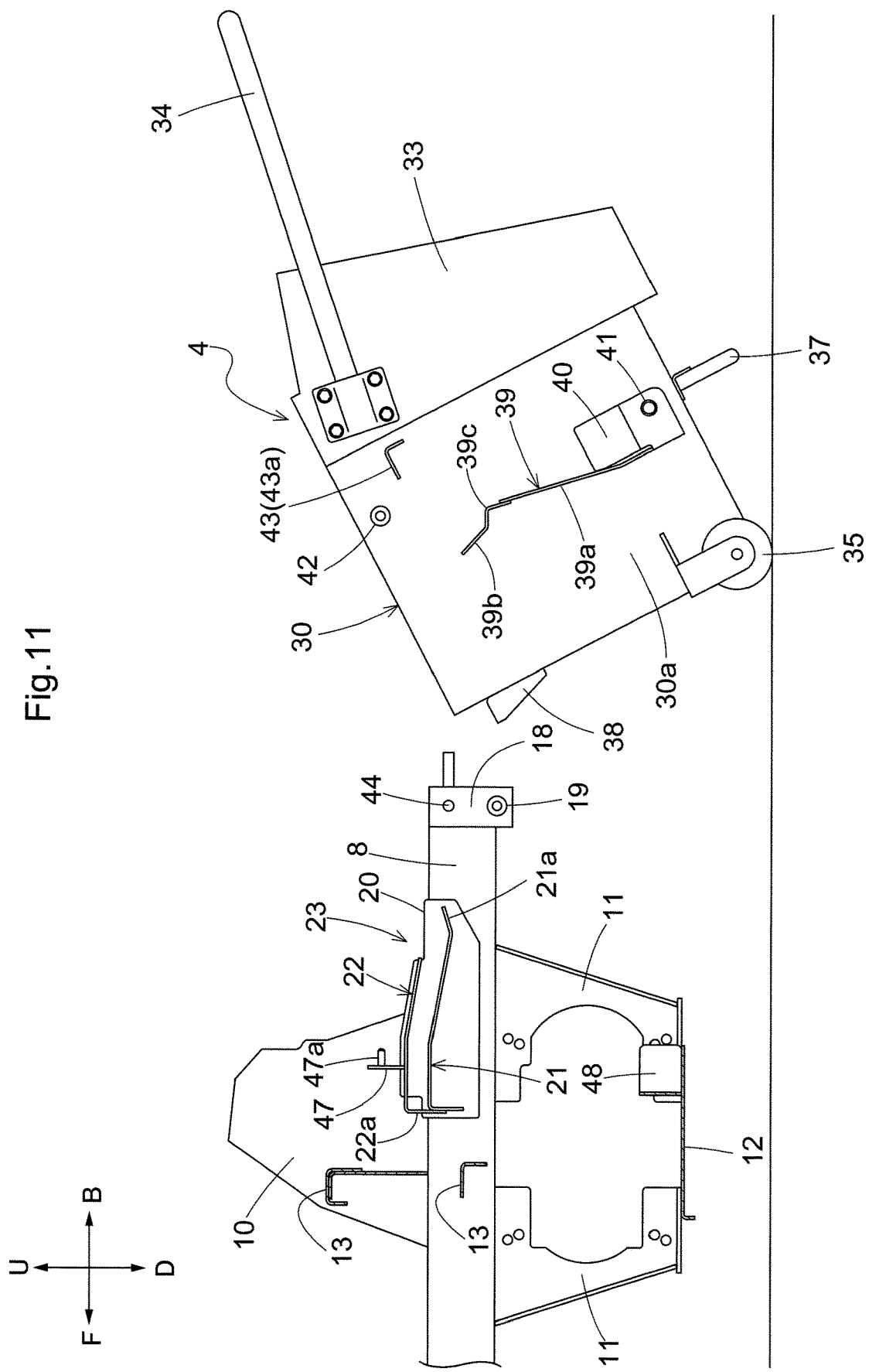
FIG. 11 is a left side view showing a situation in which the battery unit is operated into a rearward inclined posture from the situation shown in FIG. 10.

The worker will operate the cover body 24 (see FIG. 1 and FIG. 2) to its opening position; and as illustrated from FIG. 10 to FIG. 11, the worker will hold the operational handle 34 of the battery unit 4 to incline the battery unit 4 rearwardly pivotally about the wheels 35 of the battery unit 4 and then move it forwardly.

Figure 12:
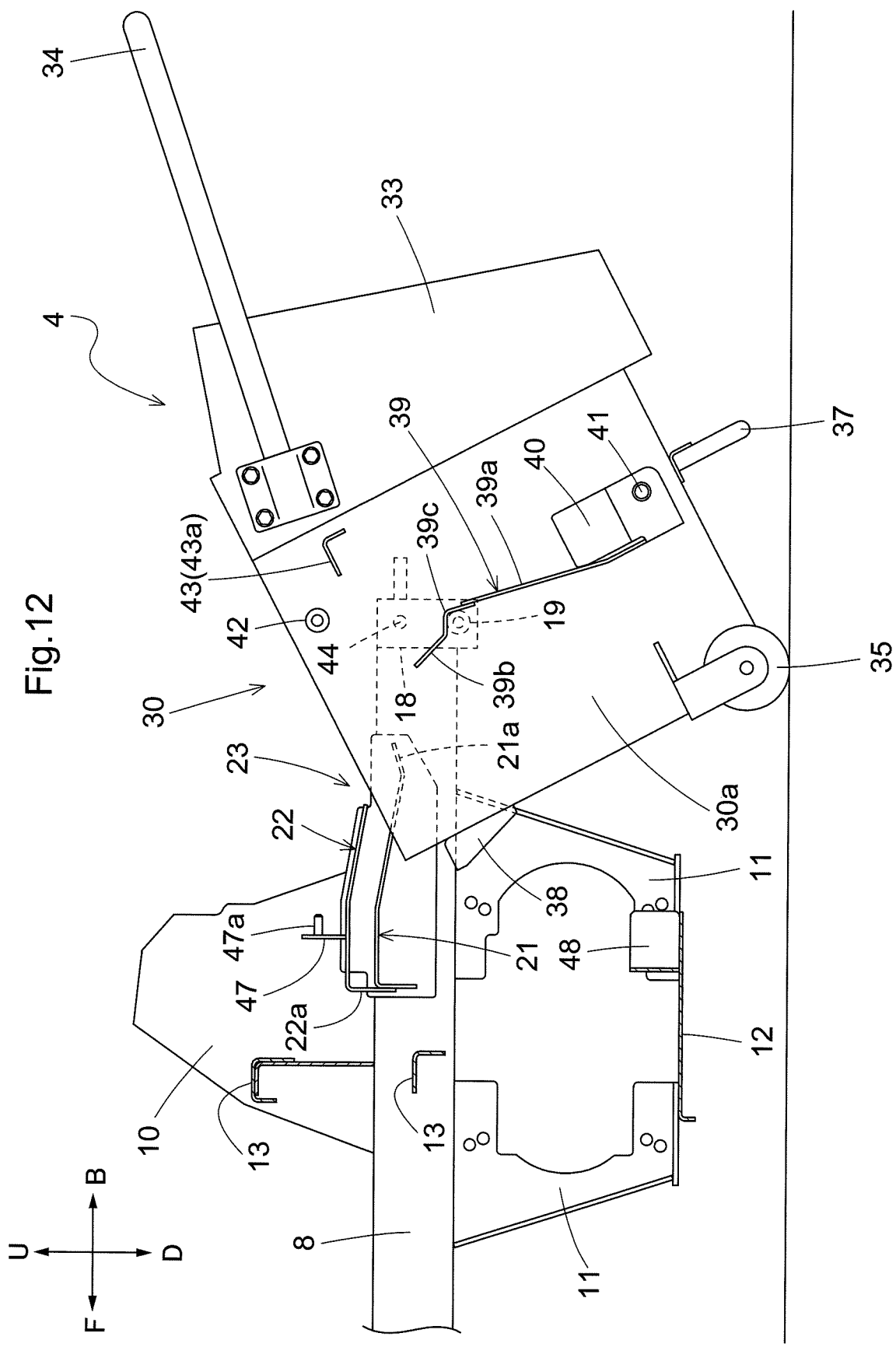
FIG. 12 is a left side view showing a situation in which the battery unit under the rearward inclined posture is operated to the forward side from the situation shown in FIG. 11.

As illustrated from FIG. 11 to FIG. 12, the worker, while advancing the battery unit 4, will insert the second sloped portions 39b of the support rails 39 of the battery unit 4 into the space between the holding pins 44 and the rollers 19 of the guide mechanisms 23 to be hooked on the rollers 19 of the guide mechanism 23 and place the intermediate portion 39c of the support rail 39 of the battery unit 4 at the roller 19 of the guide mechanism 23.

Figure 13:
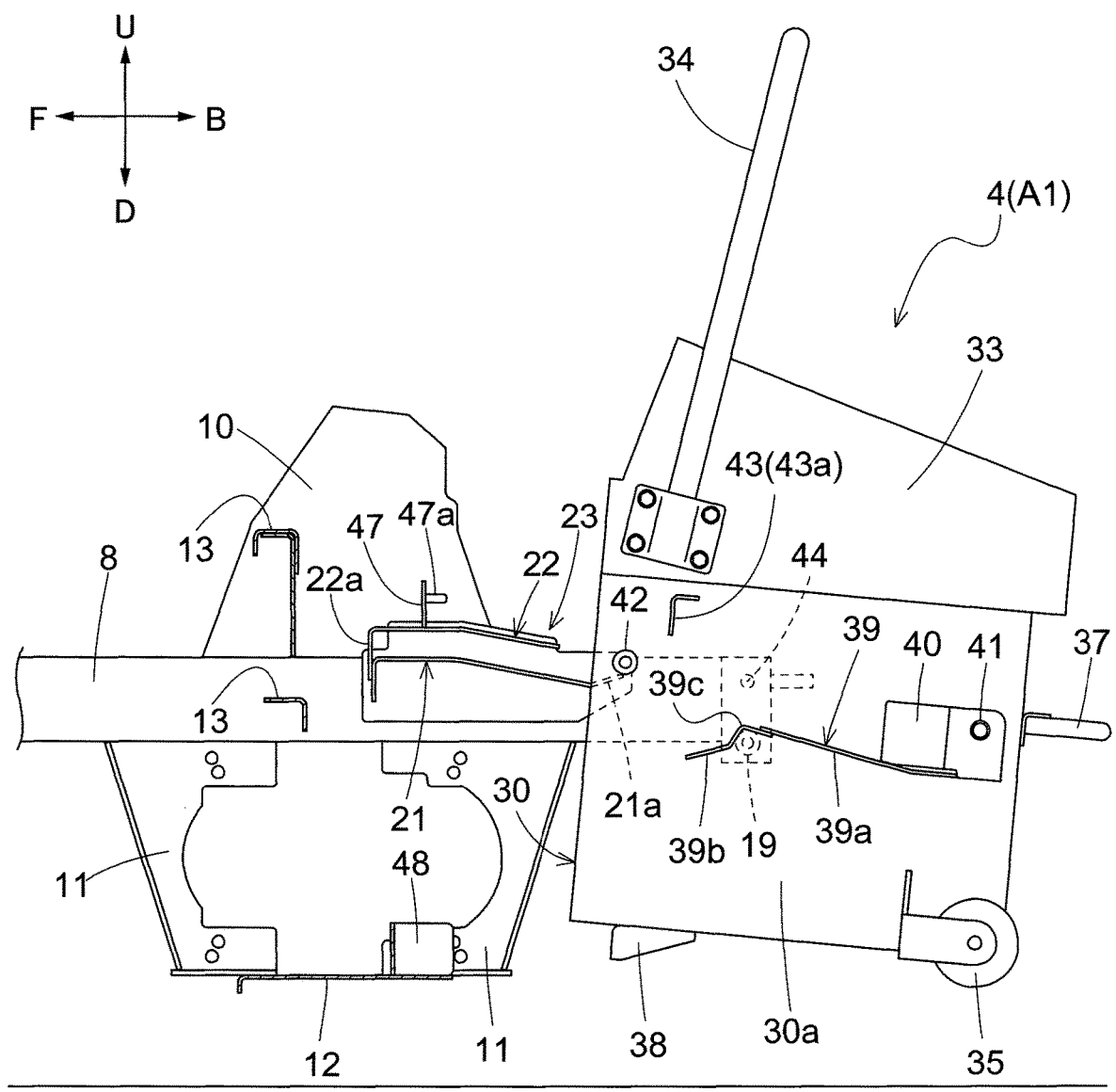
FIG. 13 is a left side view showing a situation in which the battery unit is operated to a detachment position from the situation shown in FIG. 12.

As illustrated from FIG. 12 to FIG. 13, the worker will hold the operational handles 34, 37 of the battery unit 4 and lift up the entire battery unit 4 from the rearwardly inclined state to an erected state pivotally about the roller 19 of the guide mechanism 23, so that the roller 42 of the battery unit 4 will be placed on the rear portion 21a of the guide rail 21 of the guide mechanism 23.

In the course of the worker's lifting-up of the entire battery unit 4, thanks to the engagement between the second sloped portion 39b of the support rail 39 of the battery unit 4 and the roller 19 of the guide mechanism 23, the support rail 39 of the battery unit 4 will hardly become detached from the roller 19 of the guide mechanism 23, so the lifting-up operation of the entire battery unit 4 can be carried out easily and smoothly.

The situation illustrated in FIG. 13 is a situation in which the battery unit 4 is placed at the detachment position A1. In this, the holding pin 44 (holding mechanism 46) and the roller 19 of the guide mechanism 23 are set at the portion of the guide mechanism 23 at the detachment position A1. The holding pin 44 is set at a position upwardly of the roller 19 (support portion) of the guide mechanism 23.

(Battery Unit Moved from Detachment Position to Storage Position)

Figure 14:
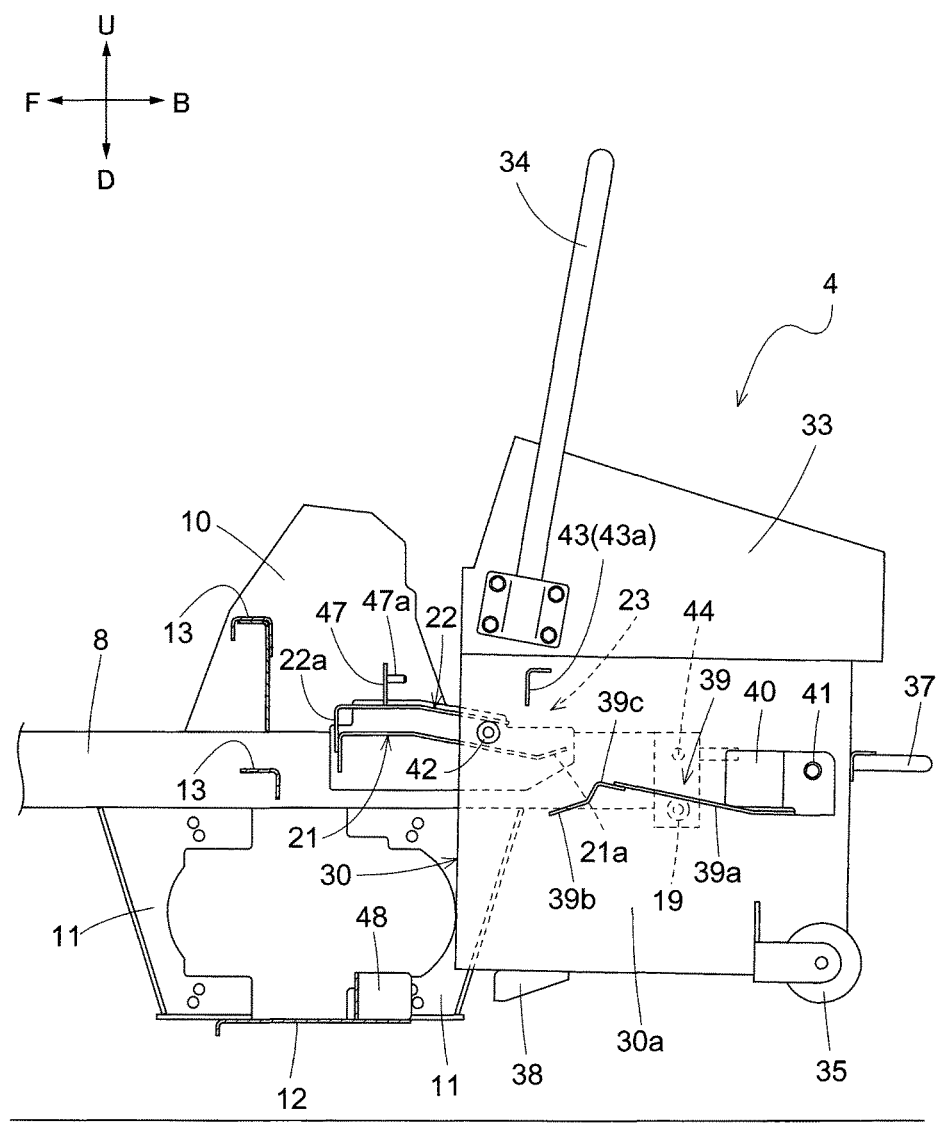
FIG. 14 is a left side view showing a situation in which the battery unit is pushed to the forward side from the situation shown in FIG. 13.
Figure 15:
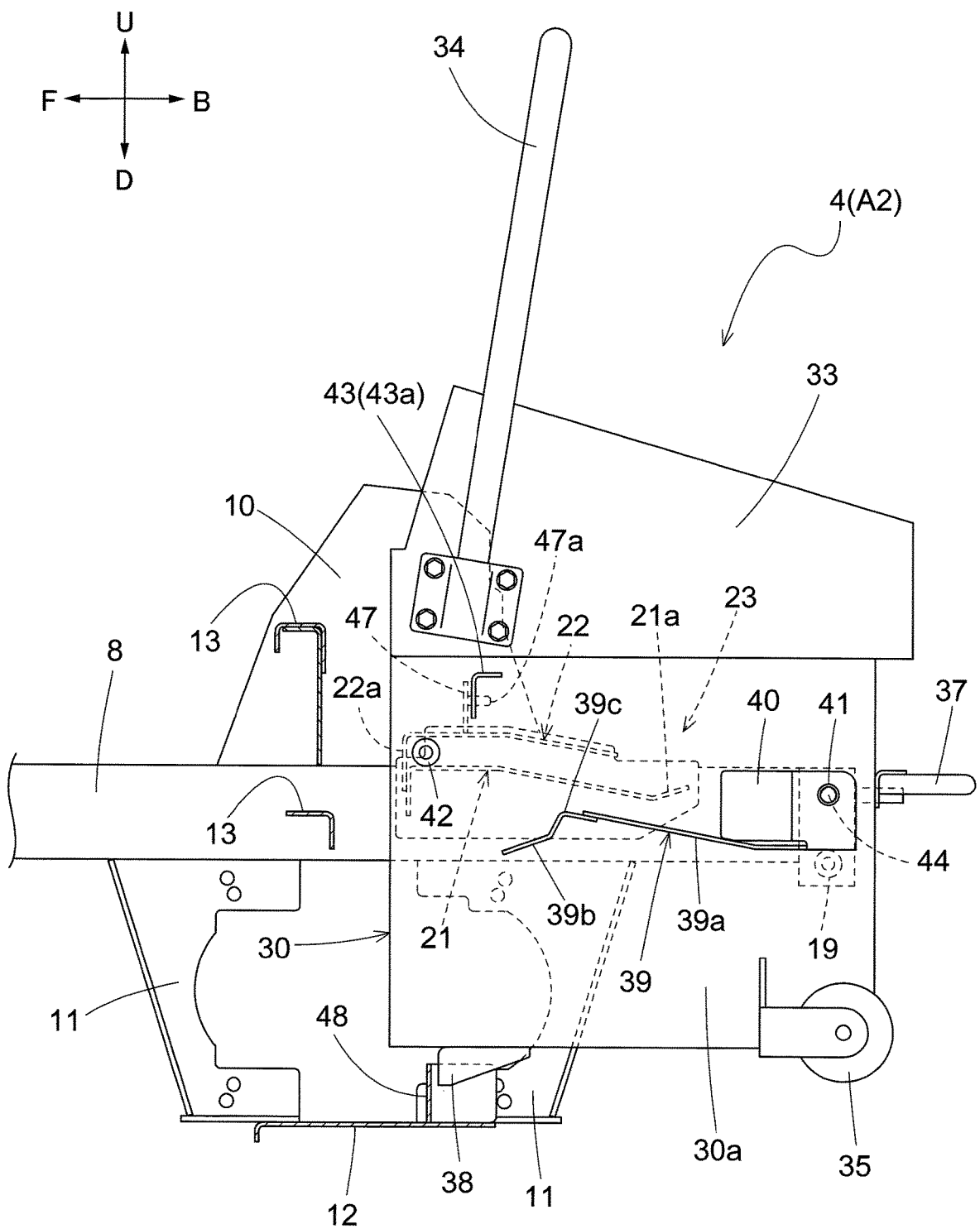
FIG. 15 is a left side view showing a situation when the battery unit is operated to a storage position.

Next, the worker, as illustrated from FIG. 13 to FIG. 14, will hold the operational handles 34, 37 of the battery unit 4 and move the battery unit 4 forwardly from the detachment position A1 to the storage position A2 (see FIG. 15).

The roller 42 of the battery unit 4 will enter between the guide rails 21, 22 of the guide mechanism 23 and the right portion and the left portion of the front portion of the battery unit 4 will climb the guide rail 21 of the guide mechanism 23 to the forward side on the obliquely upper side, while being supported to this guide rail 21.

While the first sloped portion 39a of the support rail 39 of the battery unit 4 is located between the holding pin 44 and the roller 19 of the guide mechanism 23 and supported by the guide rails 21 of the guide mechanisms 23 on the right portion and the left portion of the front portion of the battery unit 4, the first sloped portion 39a of the support rail 39 of the battery unit 4 climb the roller 19 of the guide mechanism 23 obliquely upwards to the forward side.

In this case, as the roller 42 of the battery unit 4 is located between the guide rails 21, 22 of the guide mechanism 23, the battery unit 4 will be moved from the detachment position A1 toward the storage position A2 with maintaining its posture shown in FIG. 14, without being rendered into rearwardly inclined posture or forwardly inclined posture pivotally about the roller 19 of the guide mechanism 23.

As illustrated in FIGS. 12 through 15 described above, the battery unit 4 will be moved and guided by the guide mechanism 23 while being supported thereby along the horizontal direction to/between the storage position A2 at which the battery unit 4 is accommodated in the vehicle body 7, and the detachment position A1 at which the battery unit 4 is horizontally away from the storage position A2 to be detachable.

With the one and other side face portions 30a of the battery unit 4 (storage body 30) being supported in the direction (left/right direction) orthogonal to the horizontal direction, relative to the moving direction (front/rear direction) of the battery unit 4 by the guide mechanism 23, the battery unit 4 is supported and guided by the guide mechanism 23.

The arrangement of the rear half portion of the guide rail 21 of the guide mechanism 23 is extended obliquely downwards toward the rear side, thus being provided in a sloped shape and also due to the first sloped portion 39a of the support rail 39 of the battery unit 4, the position of the battery 4 at the detachment position A1 is set at a position slightly lower than the position of the battery unit 4 at the storage portion A2.

With the above, the battery unit 4 is supported and guided by the guide mechanism 23, in such a manner that the position of the battery unit 4 becomes gradually higher in association of the moving operation of the battery unit 4 from the detachment position A1 to the storage position A2 and also that the position of the battery unit 4 becomes gradually lower in association with the moving operation of the battery unit 4 from the storage position A2 to the detachment position A1.

(Holding Mechanism when Battery Unit is Moved to Storage Position)

As shown in FIG. 9 and FIGS. 14-15, in association with the moving operation of the battery unit 4 to the storage position A2 along the guide mechanism 23, by the guide plate 40 of the battery unit 4, the holding pin 44 is pushed into the support bracket 18 against the spring 45.

When the battery unit 4 is moved to the storage position A2, alignment is established between the pipe member 41 of the battery unit 4 and the holding pin 44, so that the holding pin 44 will automatically enter the pipe member 41 of the battery unit 4 by the force of the spring 45 and the holding pin 44 will come into engagement with the pipe unit 41 of the battery unit 4 to act thereon.

In this way, the holding mechanism 46 is automatically operated into its holding state, thus holding the battery unit 4 at the storage position A2. Thereafter, the worker will operate the cover body 24 (see FIG. 1 and FIG. 2) to its closing position.

Due to the arrangement of the holding pins 44 being provided in the right and left support brackets 18 as shown in FIGS. 3, 4 and 5, and to the arrangement the guide plates 40 and the pipe members 41 being provided in the one and other side face portions 30a of the battery unit 4 (storage body 30) as shown in FIGS. 6, 7 and 8, the holding mechanism 46 is provided in the guide mechanism 23 so as to act on both the one and other side face portions 30a of the battery unit 4 (storage body 30).

As shown in FIGS. 3, 4, 5 and 9, due to the arrangement that the holding pin 44 is supported to the support bracket 18 to be movable along the axis P4 along the left/right direction, the holding mechanism 46 acts on both the one and other side face portions 30a of the battery unit 4 (storage body 30) in the direction (left/right direction) orthogonal to the moving direction (front/rear direction) of the battery unit 4 by the guide mechanism 23 along the horizontal direction.

(Positioning Portion when Battery Unit Moved to Storage Position)

As shown in FIG. 15, when the battery unit 4 is moved to the storage position A2, along the moving direction (front/rear direction) of the battery unit 4 by the guide mechanism 23, the pin 47a of the positioning plate 47 is inserted into the opening portion 43a of the positioning plate 43 of the battery unit 4.

Under the state of the pin 47a of the positioning plate 47 being inserted into the opening portion 43a of the positioning plate 43 of the battery unit 4, the position of the battery unit 4 is fixedly determined in the directions (left/right direction and vertical direction) orthogonal to the moving direction (front/rear direction) of the battery unit 4 by the guide mechanism 23.

Due to the contact established between the positioning plate 47 and the positioning plate 43 of the battery unit 4, the position of the battery unit 4 is fixedly determined in the moving direction (front/rear direction) of the battery unit 4 by the guide mechanism 23.

When the battery unit 4 is moved to the storage position A2, the roller 42 of the battery 4 reaches the front portion 22a of the guide rail 22 of the guide mechanism 23, between the guide rails 21, 22 of the guide mechanism 22 and also between the right and left support plates 20 (the vehicle body frame 8).

With the above arrangement, the position of the battery unit 4 is fixedly determined, in the directions (left/right direction and vertical direction) orthogonal to the moving direction (front/rear direction) of the battery unit 4 by the guide mechanism 23.

When the battery unit 4 is moved to the storage position A2, the front support portion 38 of the battery unit 4 enters the positioning plate 48 of the vehicle body 7.

Due to establishment of contact between the right portion (left portion) of the front support portion 38 of the battery unit 4 and the right (left) portion of the positioning plate 48 of the vehicle body 7, the position of the battery unit 4 is fixedly determined in the direction (left/right direction) orthogonal to the moving direction (front/rear direction) of the battery unit 4 by the guide mechanism 23.

Due to contact between the left/right center portion of the front support portion 38 of the battery unit 4 and the left/right center portion of the positioning plate 48 of the vehicle body 7, the position of the battery unit 4 is fixedly determined in the moving direction (front/rear direction) of the battery unit 4 by the guide mechanism 23.

Under the situation of the battery unit 4 being located at the storage position A2, the positioning plate 47 and the positioning plate 43 of the battery unit 4 act on a more front side portion of a portion of the battery unit 4 closer to the storage position A2 than the center position of the battery unit 4 in the moving direction (front/rear direction) of the battery unit 4 by the guide mechanism 23.

When the battery unit 4 is located at the storage position A2, between the roller 42 of the battery unit 4 and the guide rails 21, 22 (front portion 22a) of the guide mechanism 23 and between the front support portion 38 of the battery unit 4 and the positioning plate 48 of the vehicle body 7, an action occurs at a position similar to that of the positioning plate 47 and the positioning plate 43 of the battery unit 4.

(Battery Unit Moved from Storage Position Toward Detachment Position)

When the battery unit 4 is held at the storage position A2, the worker will operate the cover body 24 (see FIG. 1 and FIG. 2) to its opening position.

As shown in FIGS. 3, 4, 5 and 9, the worker will hold the grip portion 44a of the holding pin 44 and withdraw the holding pin 44 from the pipe member 41 of the battery unit 4 against the force of the spring 45. With this, the holding mechanism 46 is manually operated to its releasing state for allowing moving operation of the battery unit 4 to the detachment position A1.

As illustrated from FIG. 15 to FIG. 14, the worker will hold the operational handles 34, 37 of the battery unit 4 and push the battery unit 4 from the storage position A2 toward the detachment position A1.

Then, the roller 42 of the battery unit 4 will descend on the guide rail 21 of the guide mechanism 23 to the rear side obliquely downwards, while the right portion and the left portion of the front portion of the battery unit 4 are supported by the guide rail 21 of the guide mechanism 23.

The first sloped portion 39a of the support rail 39 of the battery unit 4 will descend on the roller 19 of the guide mechanism 23 to the rear side obliquely downwards, while the first sloped portion 39a of the support rail 39 of the battery unit 4 is located between the holding pin 44 and the roller 19 of the guide mechanism 23.

Simultaneously with the above, along the moving direction (front/rear direction) of the battery unit 4 by the guide mechanism 23, the pin 47a of the positioning plate 47 is withdrawn from the opening portion 43a of the positioning plate 43 of the battery unit 4. The front support portion 38 of the battery unit 4 is moved away from the positioning plate 48 of the vehicle body 7 rearwardly.

In this case, as the roller 42 of the battery unit 4 is located between the guide rails 21, 22 of the guide mechanism 23, the battery unit 4 will be moved from the detachment positon A1 toward the storage position A2 with maintaining its posture shown in FIG. 14, without being rendered into rearwardly inclined posture or forwardly inclined posture pivotally about the roller 19 of the guide mechanism 23.

As shown in FIG. 13 and from FIG. 12 to FIG. 11, when the battery unit 4 is moved to the detachment position A1, the worker will incline the battery unit 4 rearwardly and pivotally about the roller 19 of the guide mechanism 23 and place the wheel 35 of the battery unit 4 onto the ground surface and then detach the battery unit 4 from the vehicle body 7 (guiding mechanism 23).

First Further Embodiment of Present Invention

It may be alternatively arranged such that the battery unit 4 is movably supported and guided by the guide mechanism 23 between the storage position A2 and the detachment position A1 which is forwardly distant from the storage position A2 along the horizontal direction.

It may be alternatively arranged such that the battery unit 4 is movably supported and guided by the guide mechanism 23 between the storage position A2 and the detachment position A1 which is distant from the storage position A2 on the right side or left side along the horizontal direction.

Second Further Embodiment of Present Invention

In the holding mechanism 46, the holding pin 44 may be provided in the battery unit 4 and the guide plate 40 and the pipe member 41 may be provided in the vehicle body frame 8.

The holding mechanism 46 may be provided at the portion of the guide mechanism 23 at the storage position A2, not at the portion of the guide mechanism 23 at the detachment position A1.

Third Further Embodiment of Present Invention

The guide mechanism 23 may be provided not in the right and left vehicle body frames 8, but in the frame 12 so as to support and guide the bottom portion of the battery unit 4.

In this case, in the holding mechanism 46, the holding pin 44 may be provided in one of the bottom portion of the battery unit 4 and the frame 12; and the guide plate 40 and the pipe member 41 may be provided in the other of the bottom portion of the battery unit 4 and the frame 12.

Fourth Further Embodiment of Present Invention

In the positioning portion, the opening portion may be provided in the positioning plate 47 and the pin may be provided in the positioning plate 43 of the battery unit 4.

INDUSTRIAL APPLICABILITY

The present invention is applicable not only to an electric powered mower vehicle, but to other riding type electric powered work vehicle, or a walk-behind type electric powered work vehicle.

DESCRIPTION OF SIGNS

4: battery unit (battery)
7: vehicle body
19: roller (support portion)
21: guide rail (positioning portion)
22: guide rail (positioning portion)
23: guide mechanism
30*a*: side face portion
38: front support portion (positioning portion)
39: support rail
39*b*: second sloped portion (sloped portion)
39*c*: intermediate portion
40: guide plate (engaged portion)
41: pipe member (engaged portion)
42: roller (positioning portion)
43: positioning plate (positioning portion)
43*a*: opening portion
44: holding pin (engaging portion)
44*a*: gripping portion (releasing operational portion)
45: spring
46: holding mechanism
47: positioning plate (positioning portion)
47*a*: pin
48: positioning plate (positioning portion)
A1: detachment position
A2: storage position

The invention claimed is:

1. An electric powered work vehicle comprising:
a battery;
a body frame extending in a front-rear direction of a body of the electric powered work vehicle;
a guide mechanism for guiding the battery in such a manner so as to be movable in the front-rear direction along a horizontal direction while supporting the battery between a storage position at which the battery is accommodated in a vehicle body and a detachment position at which the battery is located a distance away from the storage position along the horizontal direction to be detachable, the guide mechanism including a rear portion of the body frame;
a holding mechanism configured to be urged toward a holding state in which the holding mechanism is configured to hold the battery at the storage position when the battery is moved to the storage position along the guide mechanism; and
a releasing operational portion manually operable during which the holding mechanism is moved to a releasing state in which the holding mechanism is configured to allow for movement of the battery to the detachment position,
wherein the releasing operational portion is at a rear end portion of the body frame.

2. The electric powered work vehicle of claim 1, wherein:
the holding mechanism comprises an engaging portion provided in one of the battery and the guide mechanism, an engaged portion provided in the other of the battery and the guide mechanism and an urging portion urging the engaging portion toward the engaged portion for engagement therewith; and
the holding mechanism is rendered to the holding state as the engaging portion comes into engagement with the engaged portion to act thereon.

3. The electric powered work vehicle of claim 2, wherein when the battery is moved from the detachment position to the storage position, the guide mechanism supports and guides the battery in such a manner that the position of the battery increases in an upper direction progressively as the battery moves through the guide mechanism; and when the battery is moved from the storage position to the detachment position, the guide mechanism supports and guides the battery in such a manner that the position of the battery increases in a lower direction progressively as the battery moves through the guide mechanism.

4. The electric powered work vehicle of claim 1, further comprising:
a positioning portion configured to position the battery by acting on the battery at the storage position, the positioning portion acting on a portion of this battery which is forward of a center of the battery in the front-rear direction, wherein:
the battery comprises an opening portion;
the positioning portion comprises a pin disposed along the moving direction of the battery by the guide mechanism and the opening portion through which the pin is inserted/withdrawn along the moving direction of the battery by the guide mechanism; and
the positioning portion is configured to position the battery with the pin being inserted in the opening portion.

5. An electric powered work vehicle comprising:
a battery;
a guide mechanism for guiding the battery in such a manner so as to be movable in a front-rear direction along a horizontal direction while supporting the battery between a storage position at which the battery is accommodated in a vehicle body and a detachment position at which the battery is located a distance away from the storage position along the horizontal direction to be detachable;
a holding mechanism configured to be urged toward a holding state in which the holding mechanism is configured to hold the battery at the storage position when the battery is moved to the storage position along the guide mechanism; and
a releasing operational portion manually operable during which the holding mechanism is moved to a releasing state in which the holding mechanism is configured to allow for movement of the battery to the detachment position,
wherein:
the battery comprises a left side face portion and a right side face portion that are lateral to the body when the battery is at the storage position;
the guide mechanism supports the battery by supporting the side face portions of the battery in a direction orthogonal to a moving direction of the battery by the guide mechanism along the horizontal direction; and
the holding mechanism is provided in the guide mechanism to act on the side face portions of the battery.

6. The electric powered work vehicle of claim 5, wherein the holding mechanism acts on the side face portions of the battery in the direction orthogonal to the moving direction of the battery by the guide mechanism along the horizontal direction.

7. The electric powered work vehicle of claim 5, further comprising:
a positioning portion configured to position the battery by acting on the battery at the storage position, the positioning portion acting on a portion of this battery which is forward of a center of the battery in the front-rear direction, wherein:
the battery comprises an opening portion;
the positioning portion comprises a pin disposed along the moving direction of the battery by the guide mechanism and the opening portion through which the pin is inserted/withdrawn along the moving direction of the battery by the guide mechanism; and
the positioning portion is configured to position the battery with the pin being inserted in the opening portion.

8. An electric powered work vehicle comprising:
a battery;
a guide mechanism for guiding the battery in such a manner so as to be movable in a front-rear direction along a horizontal direction while supporting the battery between a storage position at which the battery is accommodated in a vehicle body and a detachment position at which the battery is located a distance away from the storage position along the horizontal direction to be detachable;
a holding mechanism configured to be urged toward a holding state in which the holding mechanism is configured to hold the battery at the storage position when the battery is moved to the storage position along the guide mechanism; and
a releasing operational portion manually operable during which the holding mechanism is moved to a releasing state in which the holding mechanism is configured to allow for movement of the battery to the detachment position,
wherein the holding mechanism is provided at a rear portion of the guide mechanism.

9. The electric powered work vehicle of claim 8, further comprising a positioning portion configured to position the battery by acting on the battery at the storage position, the positioning portion acting on a portion of this battery which is forward of a center of the battery in the front-rear direction.

10. The electric powered work vehicle of claim 9, wherein:
the battery comprises an opening portion;
the positioning portion includes a pin disposed along the moving direction of the battery by the guide mechanism and the opening portion through which the pin is inserted/withdrawn along the moving direction of the battery by the guide mechanism; and
the positioning portion is configured to position the battery with the pin being inserted in the opening portion.

11. The electric powered work vehicle of claim 10, wherein:
the battery comprises a left side face portion and a right side face portion that are lateral to the body when the battery is at the storage position;
support rails are provided in the respective side face portions of the battery along the moving direction of the battery by the guide mechanism;
the guide mechanism comprises a support portion configured to support the support rails from a lower direction;
the holding mechanism is provided at a position above the support portion in the upper direction; and
the battery is supported and guided with the support rails being located between the support portion and the holding mechanism to be supported by the support portion.

12. The electric powered work vehicle of claim 11, wherein:
the holding mechanism and the support portion are provided at a portion of the guide mechanism at which the battery is in the detachment position; and
the support rail comprises a sloped portion which extends obliquely in a lower direction and backwards from an intermediate portion of the guide mechanism in the front rear direction.

* * * * *